United States Patent
Alexandropoulos

(10) Patent No.: US 7,135,787 B2
(45) Date of Patent: Nov. 14, 2006

(54) SELF-CONTAINED KEYLESS ENTRY SYSTEM TO PREVENT LOCKOUT FROM RESTRICTED-ACCESS SPACES

(75) Inventor: George J. Alexandropoulos, Westford, MA (US)

(73) Assignee: GeoCentric Systems, Inc., Westford, MA (US)

( * ) Notice: Subject to any disclaimer, the term of this patent is extended or adjusted under 35 U.S.C. 154(b) by 0 days.

(21) Appl. No.: 10/774,185

(22) Filed: Feb. 6, 2004

(65) Prior Publication Data
US 2004/0164615 A1    Aug. 26, 2004

Related U.S. Application Data

(60) Provisional application No. 60/446,064, filed on Feb. 7, 2003.

(51) Int. Cl.
B60R 25/04 (2006.01)
(52) U.S. Cl. .............. 307/10.4; 307/10.5; 70/278.1
(58) Field of Classification Search .......... 307/10.4, 307/10.5; 361/172; 70/278.1
See application file for complete search history.

(56) References Cited

U.S. PATENT DOCUMENTS

| | | | |
|---|---|---|---|
| 4,149,212 A | | 4/1979 | Willach .................... 361/172 |
| 4,197,524 A | | 4/1980 | Salem ...................... 340/5.51 |
| 4,425,597 A | * | 1/1984 | Schramm .................. 361/172 |
| 4,447,850 A | * | 5/1984 | Asher ....................... 361/172 |
| 4,499,462 A | * | 2/1985 | Stoesser et al. ........... 340/5.51 |
| 4,809,199 A | * | 2/1989 | Burgess et al. ........... 340/5.21 |
| 5,021,776 A | * | 6/1991 | Anderson et al. ......... 340/5.22 |
| 5,781,125 A | * | 7/1998 | Godau et al. .......... 340/870.01 |

* cited by examiner

*Primary Examiner*—Robert L. Deberadinis
(74) *Attorney, Agent, or Firm*—Guerin & Rodriguez, LLP; Michael A. Rodriguez

(57) ABSTRACT

The disclosed technology can be used to develop systems and perform methods in which movements (e.g., manipulations of a door handle) associated with a locking element can be detected based on a sequence of signal interruptions caused by these movements and such sequence of signal interruptions can further serve as a basis for identifying an authorized user and as a basis for actuating the locking element to enable the authorized user to gain access to a restricted-access space defined within an enclosure (e.g., an automobile, a boat, an aircraft, a building, a container, a cabinet, etc.).

26 Claims, 14 Drawing Sheets

SELF-CONTAINED KEYLESS ENTRY SYSTEM TO PREVENT LOCKOUT FROM RESTRICTED-ACCESS SPACES

CLAIM OF PRIORITY

This is a nonprofessional of U.S. Provisional Patent Application No. 60/446,064, filed on Feb. 7, 2003, now abandoned the entirety of which is incorporated herein by reference.

TECHNICAL FIELD

The disclosed technology relates generally to locks and more particularly to self-contained keyless entry systems and methods that can be used to prevent lockout from restricted-access spaces.

BACKGROUND

Individuals, corporations, and/or other entities maintaining one or more restricted-access spaces (such as spaces defined within the interiors of land, sea, or air vehicles, buildings, hazardous material containers, controlled-pharmaceutical cabinets, dangerous and/or expensive item storage areas, and/or any other type of area or space where locking mechanisms have been provided to ensure that access to a secure space is limited to authorized individuals) balance the need for maintaining the security of the restricted-access spaces against the difficulty in gaining access to such spaces. Access to restricted-access spaces typically requires that an authorized entity insert a key into a locking mechanism that controls access to a particular restricted-access space.

In addition to ubiquitous key-type locks, relatively recent developments in keyless entry systems enable an individual with a radio frequency ("RF") transmitter to remotely manipulate a locking mechanism associated with a restricted-access space by transmitting an RF signal to a corresponding RF receiver that is adapted to operate the locking mechanism in response to the receipt of the signal. Unfortunately, physical keys and transmitters can be lost, misplaced, or stolen, thereby significantly increasing the difficulty in gaining access to a restricted-access space by an authorized individual. Accordingly, users and maintainers of restricted-access spaces have a continuing interest in developing self-contained entry systems that do not require authorized individuals to carry keys, transmitters, and/or other devices to gain entry to such restricted-access spaces.

SUMMARY

The disclosed technology enables authorized individuals to manipulate locking mechanisms that secure restricted-access spaces without the aid of devices that are carried by such individuals. The disclosed technology can operate as a primary means of gaining entry to a restricted-access space and/or as a secondary means that can be used when a primary means is unavailable (e.g., misplaced key).

In one embodiment, the disclosed technology can be incorporated in an apparatus that is communicatively coupled to a locking mechanism, where the apparatus actuates the locking mechanism to, for example, unlock a door upon verifying the identification of an authorized individual desiring to gain access to a restricted-access space that is accessible via the door. The disclosed apparatus can verify an individual's identity by, for example, comparing a data sequence specified by the individual with a previously-stored data sequence. In one embodiment, the data sequence can be determined from a sequence of signal interruptions, such as interruptions in an infrared signal transmitted between an infrared emitter and an infrared detector of the disclosed apparatus. Entry of the data sequence can be performed with the aid of sensory feedback (e.g., audible sounds, visual indications, vibrations, etc.) so that individual elements of the data sequence can be ascertained during particular intervals. The data sequence can also be entered in a manner that reduces the likelihood that an onlooker perceives the data sequence during its entry.

In one illustrative embodiment, the disclosed technology can be used to perform methods in which movements associated with a locking element (corresponding to, for example, a solenoid in a lock) can be detected based on a sequence of signal interruptions (corresponding to, for example, interruptions in an optical signal) caused by such movements (e.g., manipulations of a door handle) and this sequence of signal interruptions can further serve as a basis for actuating the locking element to gain access to a restricted-access space defined within an enclosure (corresponding to, for example, an automobile, a boat, an airplane, a building, a container, a cabinet, etc.). At least part of the sequence of signal interruptions can be represented as a sequence of digital logic levels that can be compared with a previously-entered code to ascertain whether they are equivalent and, if such equivalence is determined, the locking element can be actuated to gain access to the restricted-access space. An equivalence between the sequence of digital logic levels and the previously-entered code can further serve as a basis for identifying a user who is authorized to access the restricted-access space. Further, an audible signal can be generated to be indicative of at least part of the sequence of signal interruptions and/or be indicative of an operating mode (corresponding to, for example, a code change request, an access request, etc.) that is identified based, at least in part, on a portion of the sequence of signal interruptions.

In one illustrative embodiment, the disclosed technology can be used to perform methods in which movements associated with a user interface (corresponding to, for example, a door handle of a vehicle) can be detected based on a sequence of signal interruptions (corresponding to, for example, interruptions in an optical signal) caused by such movements (e.g., manipulations of a door handle) and a comparison between indicia (e.g., a sequence of digital logic levels) of at least a portion of this sequence of signal interruptions with a previously-stored code can further serve as a basis for performing one or more vehicle operations (e.g., manipulation of a locking element restricting access to at least a part of the vehicle, a manipulation of a window of the vehicle, an ignition of the vehicle motor, etc.). Further a human-perceptible signal can be generated to be indicative of at least part of the sequence of signal interruptions.

In one illustrative embodiment, the disclosed technology can be used to develop systems that may include a locking element, a movement-detection element, a control element, and/or a feedback element, which may interoperate, at least in part, to enable an authorized user to gain access to a restricted-access space. A locking element (corresponding to, for example, a solenoid in a lock) can, for example, restrict access to a restricted-access space defined within an enclosure (corresponding to, for example, one or more automobiles, boats, airplanes, buildings, containers, cabinets, etc.). A movement-detection element can detect movements associated with the locking element based on a sequence of signal interruptions caused by such movements. The movement-detection element can, for example, include a signal emitter and a signal detector, where the signal detector detects the sequence of signal interruptions in an optical signal (exhibiting, for example, an infrared wavelength) transmitted by the signal emitter. A control element can receive indicia (corresponding to, for example, a sequence of digital logic levels) associated with the sequence of signal interruptions from the movement-detection element (e.g., the indicia may be transmitted by the signal detector of the movement-detection element) and can, in response to the received indicia, actuate the locking element to provide access to the restricted-access space. The control element may determine whether to actuate the locking element based on, for example, a comparison of the indicia associated with the sequence of signal interruptions with a predetermined code. The control element may also identify an operating mode based, at least partly, on a portion of the sequence of signal interruptions and such operating mode may correspond to a code change request and/or an access request. A feedback element can also generate a human-perceptible signal indicative of at least part of the sequence of signal interruptions.

BRIEF DESCRIPTION OF THE DRAWINGS

The foregoing discussion will be understood more readily from the following detailed description of the disclosed technology, when taken in conjunction with the accompanying drawings in which.

DETAILED DESCRIPTION

Figure 1:
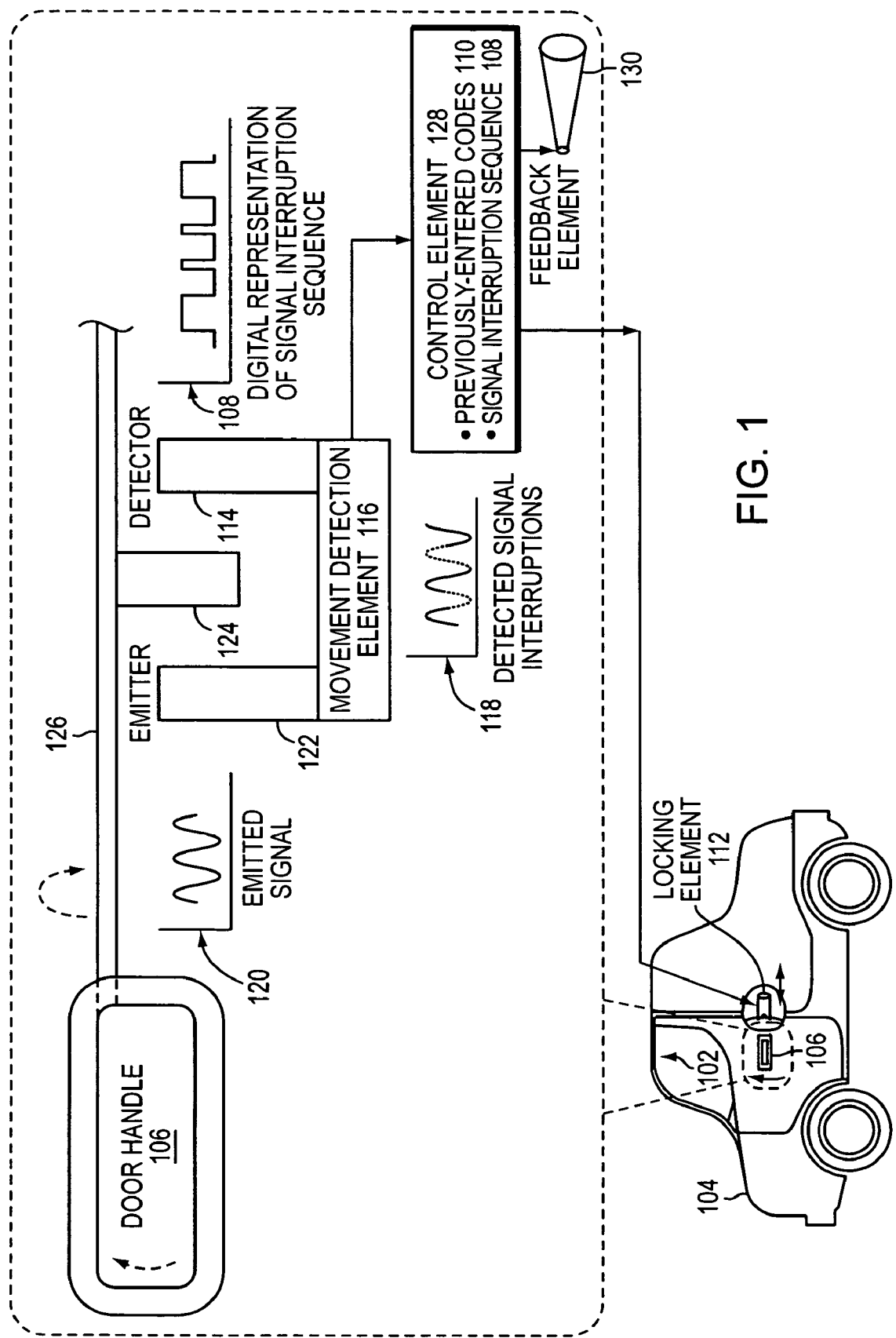
FIG. 1 schematically illustrates exemplary aspects of a self-contained, keyless entry system installed in an automobile, in accordance with one illustrative application of the disclosed technology.

Unless otherwise specified, the illustrated embodiments can be understood as providing exemplary features of varying detail of certain embodiments, and therefore, unless otherwise specified, features, components, processes, modules, data elements, and/or aspects of the illustrations can be otherwise combined, interconnected, sequenced, separated, interchanged, and/or rearranged without departing from the disclosed systems or methods. Additionally, the shapes, sizes, locations, and orientations of components are also exemplary and unless otherwise specified, can be altered without affecting the disclosed technology.

For the purposes of this disclosure, the term "substantially" can be construed broadly to indicate a precise relationship, condition, arrangement, orientation, and/or other characteristic, as well as, deviations thereof as understood by one of ordinary skill in the art, to the extent that such deviations do not materially affect the disclosed methods and systems.

For the purposes of this disclosure, the phrase "restricted-access space" can be construed broadly to refer to an extent or expanse of a surface or three-dimensional region bounded by at least a partial enclosure and for which one or more proprietary interests apply, where such proprietary interests serve as a basis for limiting access to and/or operation/manipulation of such space and/or of items contained therein or substantially adjacent thereto to authorized entities.

For the purposes of this disclosure, the term "enclosure" can be construed broadly to refer to substantially any type or combination of barriers that completely or partially restrict access to and/or at least partially bound a restricted-access space.

For the purposes of this disclosure, a "locking element" can be construed broadly to refer to substantially any type of lock, fastener, and/or part(s) thereof that is coupled to a door, portal, and/or other type of ingress/egress structure of an enclosure and which controls access to and/or operation/manipulation of a restricted-access space and/or of items contained therein or substantially adjacent thereto on behalf of one or more authorized entities.

For the purposes of this disclosure, a "sequence of signal interruptions" can be construed broadly to refer to an arrangement of disruptions in an indicator (signal), where variations in such disruptions represent coded information.

For the purposes of this disclosure, a "sequence of digital logic levels" can be construed broadly to refer to an arrangement of discrete signals/symbols from a finite set, which may be represented as binary data using electronic signals whose variations represent coded information.

For the purposes of this disclosure, the term "digital data processing device" can be construed broadly to refer to a personal computer, computer workstation, laptop computer, server computer, mainframe computer, handheld device (e.g., personal digital assistant, Pocket PC, cellular telephone, etc.), information appliance, or any other type of generic or special-purpose, processor-controlled device capable of receiving, processing, and/or transmitting digital data. A processor refers to the logic circuitry that responds to and processes instructions that drive digital data processing devices and can include, without limitation, a central processing unit, microcontroller (e.g., AT tiny 12V-1PI microcontroller produced by Atmel), an arithmetic logic unit, an application specific integrated circuit, a task engine, and/or any combinations, arrangements, or multiples thereof.

The instructions executed by a processor represent, at a low level, a sequence of "0's" and "1's" that describe one or more physical operations of a digital data processing device. These instructions can be pre-loaded into a programmable memory (e.g., EEPROM) that is accessible to the processor and/or can be dynamically loaded into/from one or more volatile (e.g., RAM, cache, etc.) and/or non-volatile (e.g., hard drive, etc.) memory elements communicatively coupled to the processor. The instructions can, for example, correspond to the initialization of hardware within a digital data processing device, an operating system that enables the hardware elements to communicate under software control and enables other computer programs to communicate, and/or software application programs/software processes that are designed to perform particular functions for an entity or other computer programs, such as functions relating to an access of a restricted-access space and/or to an actuation of items accessible therethrough.

For the purposes of this disclosure, a data communications network (e.g., Internet, intranets, etc.) can comprise a series of network nodes that can be interconnected by network devices and communication lines (e.g., public carrier lines, private lines, satellite lines, etc.) that enable the network nodes to communicate. The transfer of data (e.g., messages) between network nodes can be facilitated by network devices, such as routers, switches, multiplexers, bridges, gateways, etc., that can manipulate and/or route data from a source node to a destination node regardless of any dissimilarities in the network topology (e.g., bus, star, token ring), spatial distance (local, metropolitan, or wide area network), transmission technology (e.g., TCP/IP, Systems Network Architecture), data type (e.g., data, voice, video, or multimedia), nature of connection (e.g., switched, non-switched, dial-up, dedicated, or virtual), and/or physical link (e.g., optical fiber, coaxial cable, twisted pair, wireless, etc.) between the source and destination network nodes.

Access to and/or control of items or places to which proprietary interests attach (e.g., restricted-access spaces and/or items accessible therethrough) typically require that an individual or other type of entity provide some evidence indicative of their authorization to gain a desired access/control. For example, a key in the possession of a particular individual may be indicative of that individual's authority to enter, use, operate, and/or otherwise manipulate a particular land-based craft (e.g., automobile), aircraft, naval craft, building, container (e.g., hazardous material container, controlled-pharmaceutical cabinet, etc.), item storage area, and/or any components thereof. Keys, remote controls, and/or other types of access/control devices may be lost, misplaced, stolen, or otherwise be unavailable when an authorized individual desires to access or control a particular item and/or place. Accordingly, self-contained systems/devices, such as combination and key-pad type locks, enable authorized users to gain access to restricted-access spaces without requiring that users provide a key or other type of access/control device that is separate from the locking element controlling access to a restricted-access space of interest. Unfortunately, self-contained keyless entry systems remain vulnerable in that the codes that are entered to activate them can be readily ascertained by an observer and thus authorized access to a restricted-access space may be compromised. Although self-contained keyless entry systems incorporating biometric scanning techniques may mitigate such vulnerabilities, these relatively complex systems may be overly expensive for many applications.

The disclosed technology can be used to develop cost-effective entry and control systems that are keyless, self-contained, and less prone to compromise by unscrupulous observers. In brief overview, exemplary systems incorporating at least some aspects of the disclosed technology can be configured so that movements of a door handle or other type of device coupled to a locking element (e.g., a lock in a car door) and/or to an actuating element (e.g., ignition system of a vehicle, power window system of a vehicle, etc.) cause interruptions in an emitted signal and a sequence of such interruptions can be represented in a digital form, which can be processed to ascertain a desired mode of operation of the disclosed technology and/or to provide a code that can be used to access and/or control such exemplary systems. For example, at least a portion of a digital representation of a signal interruption sequence may be indicative of a request to access a restricted-access space, a request to control a device or item that is contained within, is substantially adjacent to, and/or is otherwise associated with a restricted-access space, a request to enter and/or modify a code affecting an access to a restricted-access space or manipulation of a device or item accessible therethrough, etc.

The disclosed technology can be used to access and/or control restricted-access spaces and/or items associated therewith in a wide variety of applications. However and in order to retain the clarity and brevity of this disclosure, the following discussion primarily focuses on illustrative embodiments pertaining to accessing/controlling a locking element that restricts access to a restricted-access space defined within at least a part of an automobile.

Figure 2:
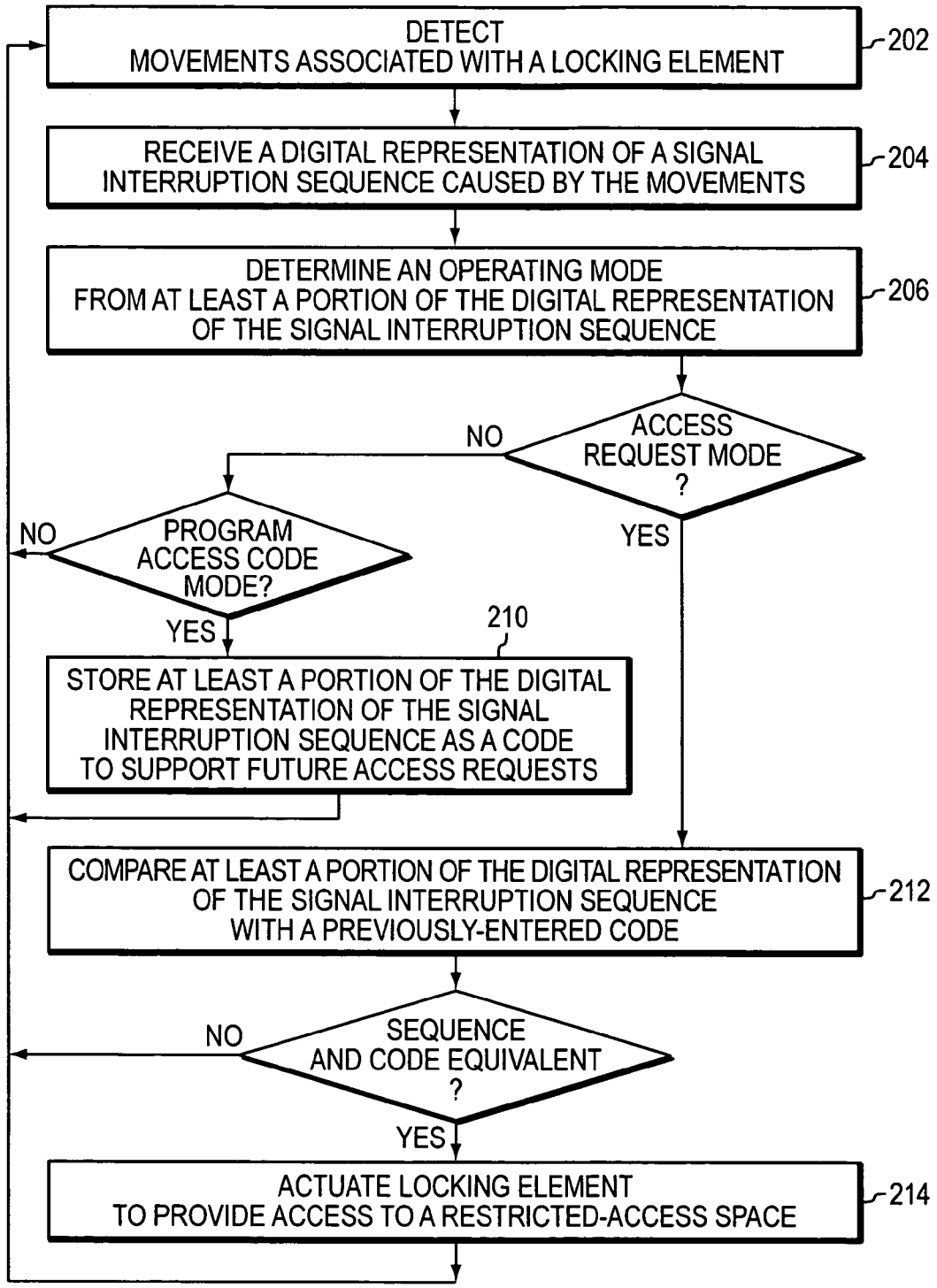
FIG. 2 illustrates an exemplary methodology that may be performed by one or more elements of the self-contained, keyless entry system of FIG. 1 in order to gain access to one or more restricted-access spaces within an automobile.

In brief overview and with reference to an illustrative embodiment of at least some aspects of the disclosed technology as shown in FIGS. 1 and 2, an individual desiring to gain access to a restricted-access space 102 defined within an interior of an automobile 104 and/or to items/devices associated therewith, can manipulate a door handle 106 of the automobile 104 in accordance with a predetermined sequence and these handle manipulations can be detected as a sequence of signal interruptions 108 that when compared with one or more previously-entered codes 110 can serve as a basis for actuating a locking element 112 that provides access to the restricted access space 102. More particularly, a signal detector component 114 of a movement detection element 116 can detect handle movements associated with the locking element 112 by, for example, detecting a sequence of interruptions 118 (e.g., partial or complete interruptions) and/or other types of interference (e.g., reduction in signal strength, change in frequency, change in phase, and/or any other type of change in a signal attribute) in an emitted signal 120 (formed by, for example, a signal emitter component 122 of the movement detection element 116) caused, at least in part, by a rotation and/or other movement of a protruding member 124 of a mechanical linkage assembly 126 affected by such movements of the door handle 106 (202). For the purposes of this disclosure the term "interruptions" can be construed to encompass any type of signal interruption and/or signal interference as described above. An illustrative and non-limiting list of emitted signal types that may be used in connection with the disclosed technology can include one or more of the following: a light signal exhibiting one or more wavelengths (e.g., infrared), a digital signal (e.g., a sequence of digital pulses), a radio frequency signal exhibiting one or more wavelengths, a sonic signal, an electrical/electronic signal, a magnetic signal, and/or any other type of signal that may emitted and for which signal interruptions/variations can be detected. Those skilled in the art will recognize that a signal interruption sequence 118 can be formed and/or detected in a variety of ways and that the disclosed technology is not limited to the mechanical linkage assembly 126, protruding member 124, signal emitter 122, and/or signal detector 114 disclosed herein.

In response to detecting at least a part of a signal interruption sequence 118, a signal detector 114 of the movement detection element 116 can form a digital representation of the signal interruption sequence 108, which can be received and processed by a control element 128 that may include, for example, one or more digital data processing devices and/or components thereof (204). The signal interruption sequence 108 and/or portions thereof can be stored in one or more memory elements communicatively coupled to the control element 128. In one embodiment, the control element 128 can process portions of the signal interruption sequence 108 in substantially real time (i.e., without inserting/introducing any time delays beyond those that are inherent in the control element 128) as such portions are received to determine a particular operating mode (206). The control element 128 may also control a feedback element 130 (such as devices that generate audible, visual, and/or other human-perceptible signals) to assist a user manipulating the door handle 106 so that the user enters a desired signal interruption sequence 108 with a reduced likelihood of error. In other embodiments, the entire signal interruption sequence 108 may be received and stored by the control element 128 prior to determining a particular operating mode.

The control element 128 can identify a particular operating mode by, for example, comparing at least a first portion of a signal interruption sequence 108 with one or more previously-entered codes 110 associated with such operating mode to identify an equivalence or non-equivalence therebetween. By way of non-limiting example and upon performing such illustrative comparisons, a control element 128 may determine that at least the first portion of a signal interruption sequence 108 does not correspond to an access request mode, which may be indicative of a user's desire to access a restricted-access space and/or to actuate an item/device associated therewith and/or accessible therethrough, but rather corresponds to a program access code mode, which may be indicative of a user's desire to store a second portion of the signal interruption sequence 108 as a new code governing future operations (e.g., future access requests) of the disclosed technology (210). If the first portion of the signal interruption sequence 108 corresponds to an access request mode, then the control element 128 can compare at least the second portion of the signal interruption sequence 108 with one or more previously-entered codes 110 (212) and, upon determining an equivalence therebetween, the control element 128 can transmit a signal and/or instruct another element to transmit a signal that actuates a locking element 112 to provide access to a corresponding restricted-access space 102 (214). The control element 128 can also transmit status and/or control signals to software processes and/or hardware elements that may be in a remote location relative to the control element 128 by, for example, transmitting such signals via a data communications network.

Figure 3:
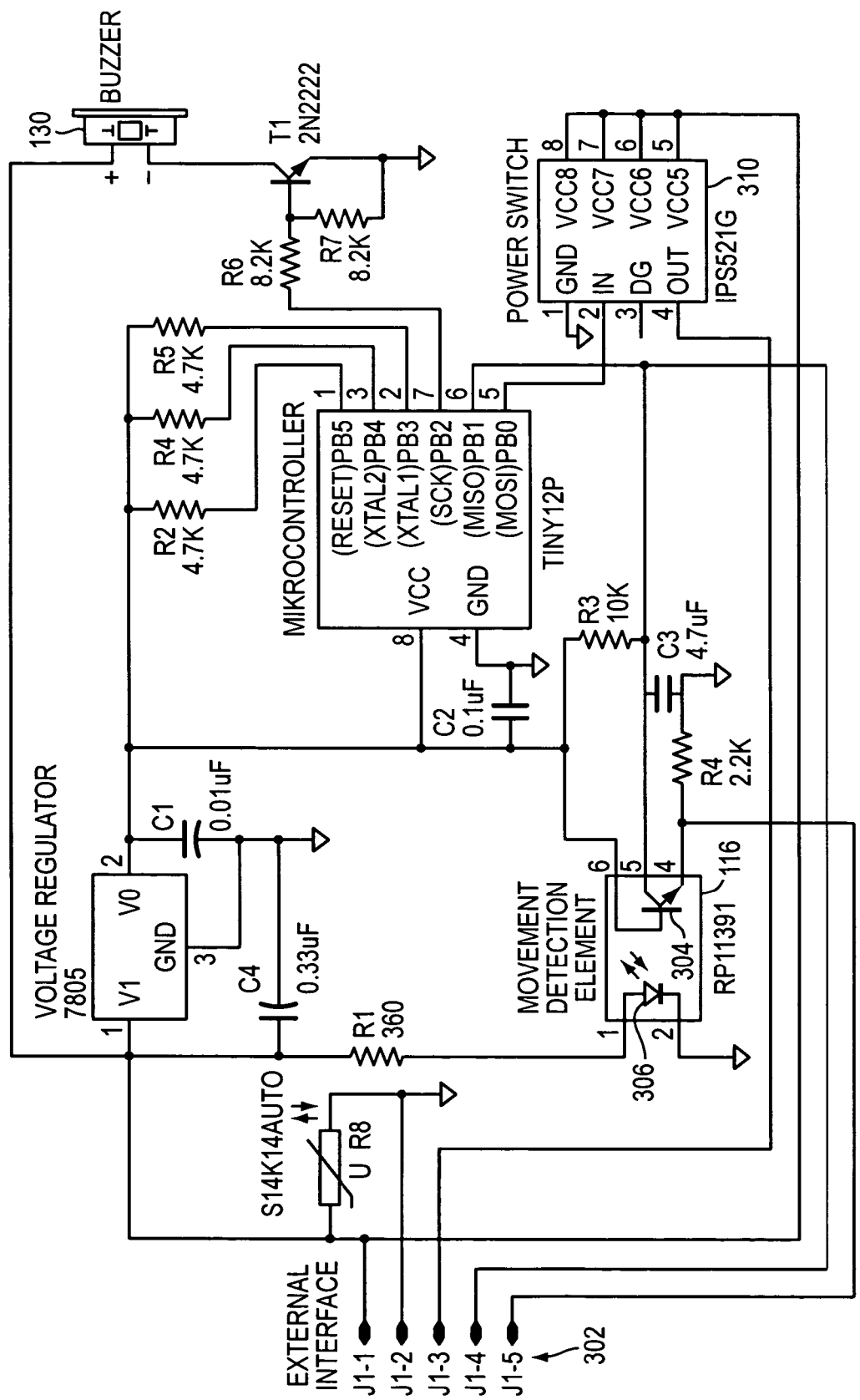
FIG. 3 provides a circuit diagram illustrating an exemplary implementation of at least some aspects of the disclosed technology.

In more detail and with reference now also to an illustrative embodiment as shown in FIG. 3, the disclosed technology can include one or more interfaces 302 that can couple one or more elements of the disclosed technology to power sources (e.g., an automotive electrical system), ground planes, and/or actuating elements (e.g., locking element 112, automotive ignition system, power door lock system, power window system, trunk opening system, garage door opening system, etc.). Those skilled in the art will recognize that one or more of such coupled elements can be integrated with one or more elements of the disclosed technology and that the disclosed embodiments described herein are merely illustrative and are not intended to be limiting. As illustrated in the exemplary circuit of FIG. 3, the disclosed technology can include a variety of resistors, capacitors, voltage regulators, power switches, and/or other electrical components that can provide, for example, noise bypass, oscillation prevention, power regulation, current limitation, signal stabilization, signal conditioning, power/signal switching, and/or other types of functions that support/enable the proper operation of this illustrative embodiment. Manipulations of a door handle 106 (FIG. 1) can be detected by a phototransistor 304 as interruptions 118 in an infrared signal generated by an infrared light emitting diode 306 and a digital representation 108 of these signal interruptions can be provided to a microcontroller 308 (via pin 6) of a control element 128 for further processing. The microcontroller 308 can energize a sensory feedback element 130 (by transmitting a signal on pin 7 of the microcontroller 308) to assist a user in making the desired door handle manipulations. Upon determining that the signal interruption sequence 108 corresponds to an access request by an authorized user, the microcontroller 308 can transmit a signal (on pin 5) to a power switch 310, which applies an electrical signal of sufficient current and voltage to actuate a locking element 112 that provides subsequent access to a restricted-access space and/or to items/devices associated therewith. Those skilled in the art will recognize that the disclosed quantity, arrangement, interconnection, and/or selection of the electrical components illustrated in FIG. 3 are merely illustrative and that a wide variety of alternatives may be used to provide substantially equivalent/similar functionality.

Figure 4A:
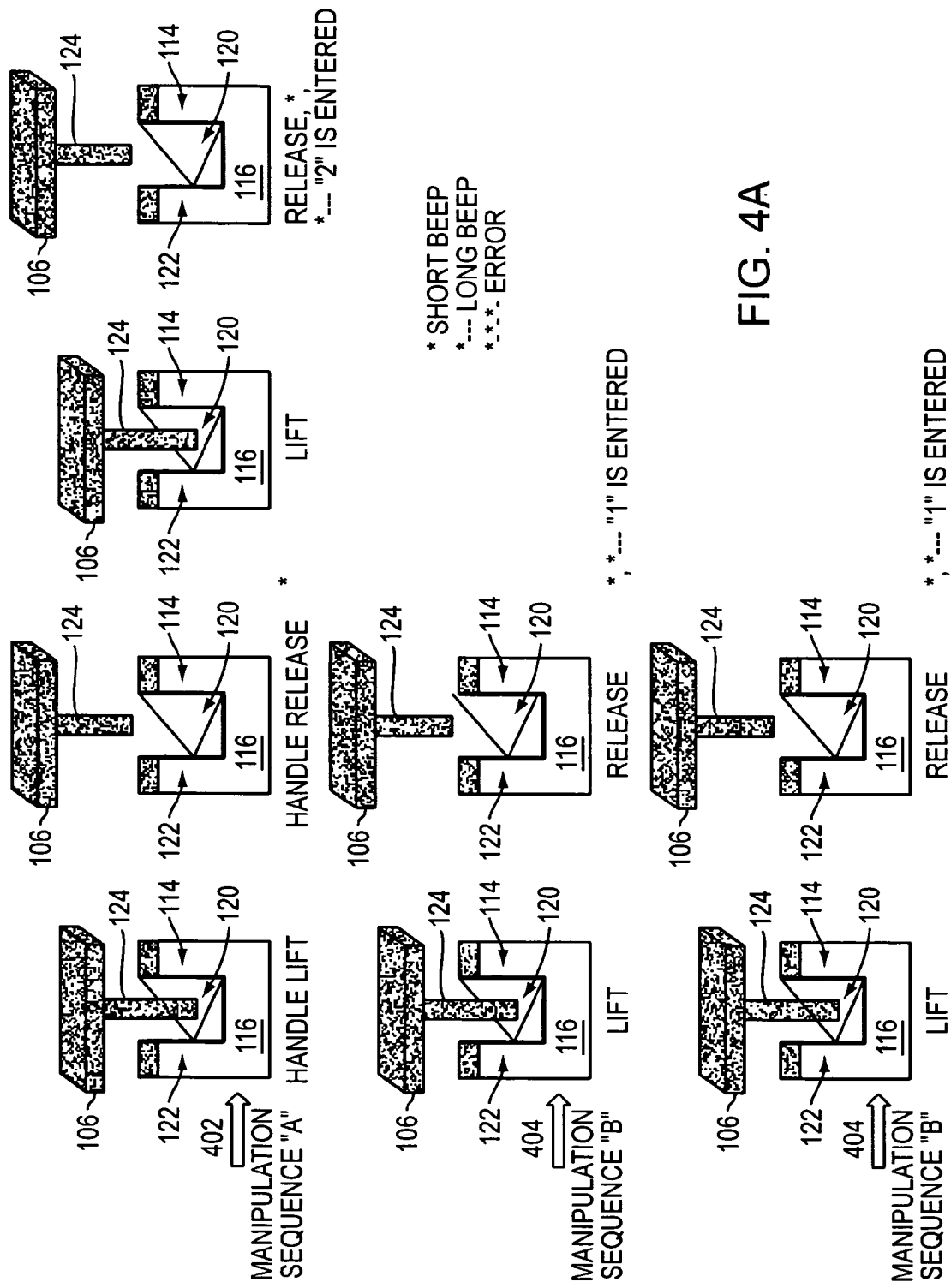
FIGS. 4A–4B illustrate how door handle manipulations can be used to form a signal interruption sequence, which can be used to obtain access to a restricted-access space.
Figure 4B:
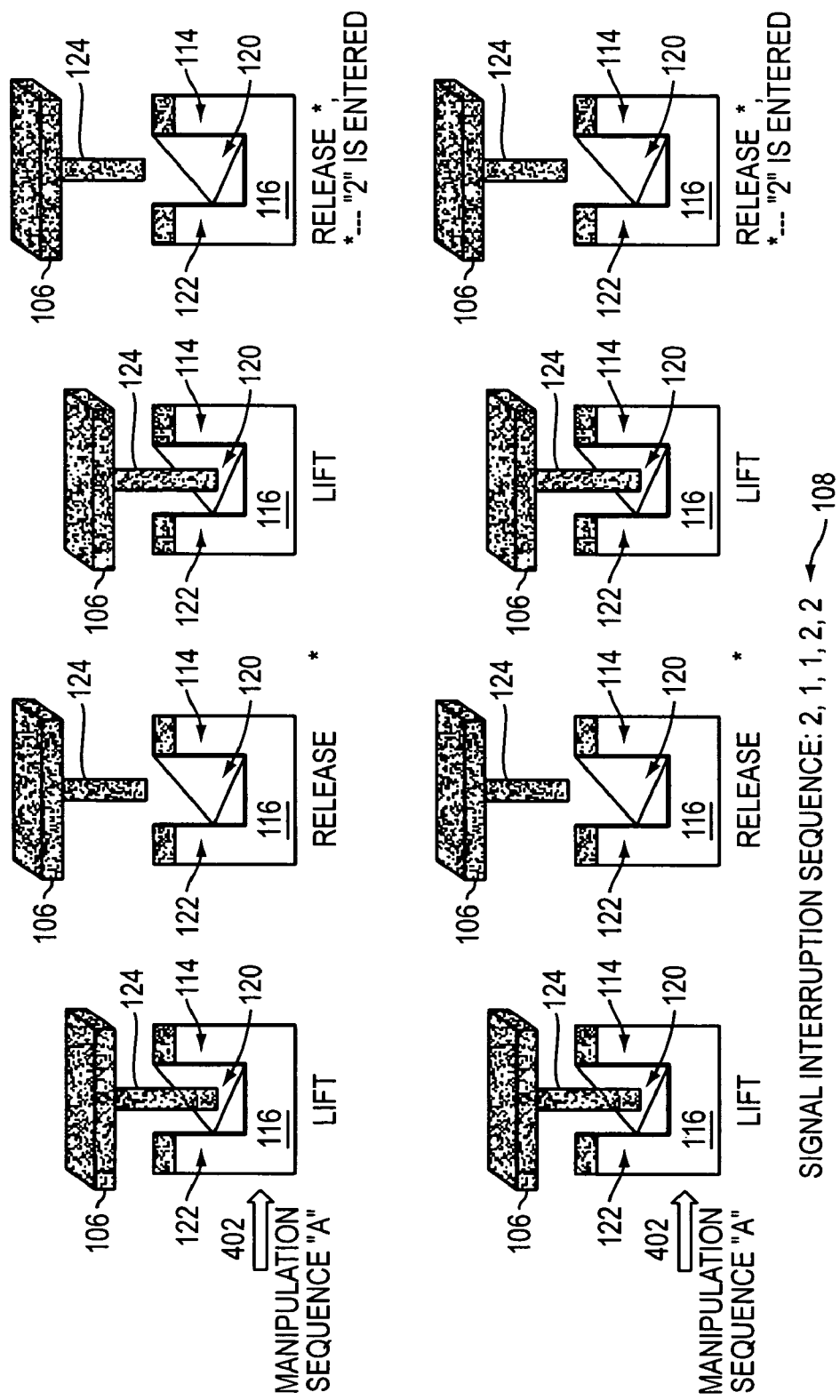
Figure 5A:
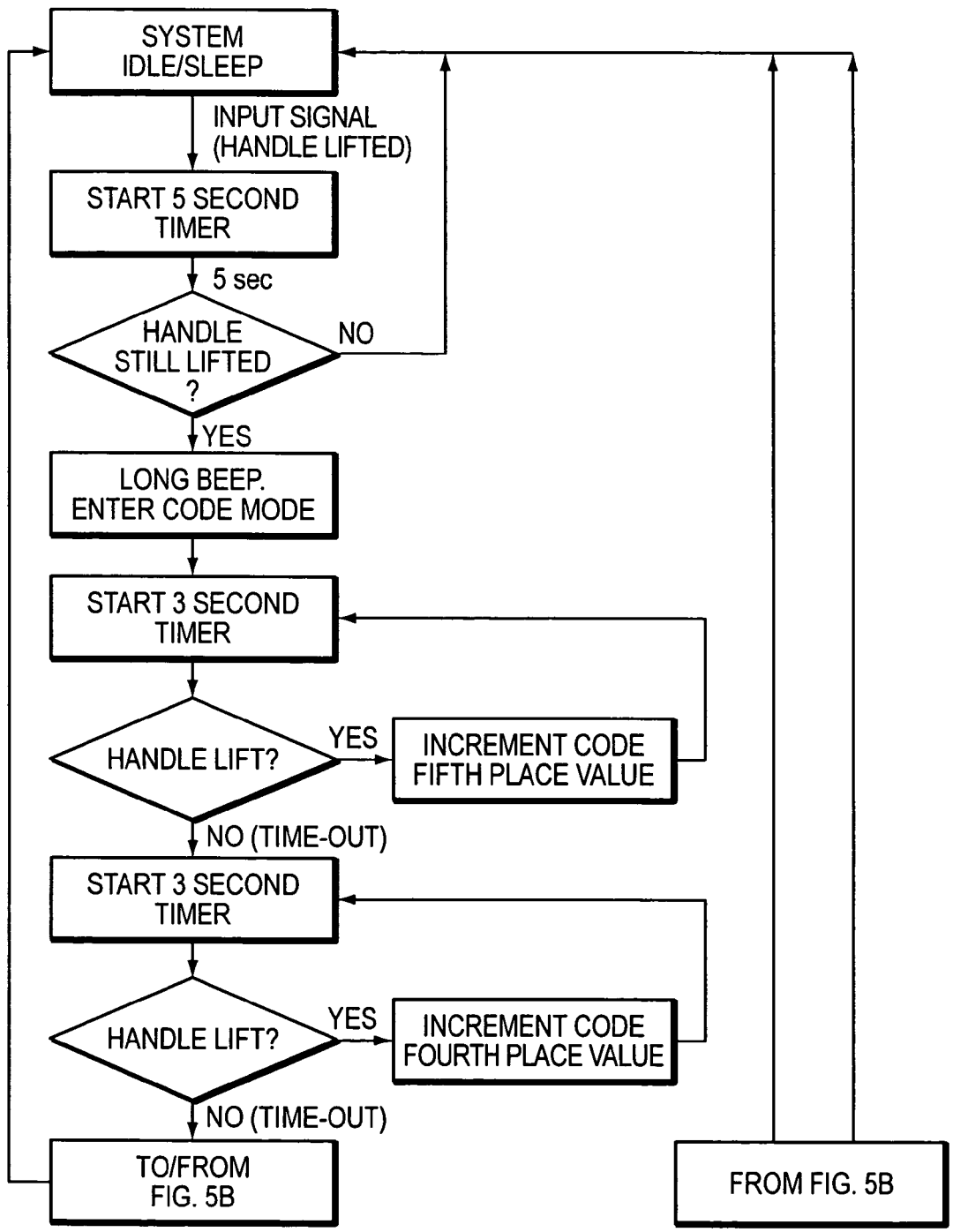
FIGS. 5A–5E provide an exemplary illustration of how time intervals can be used in concert with door handle manipulations to identify operating modes and to enter/increment digits associated with a signal interruption sequence.
Figure 5B:
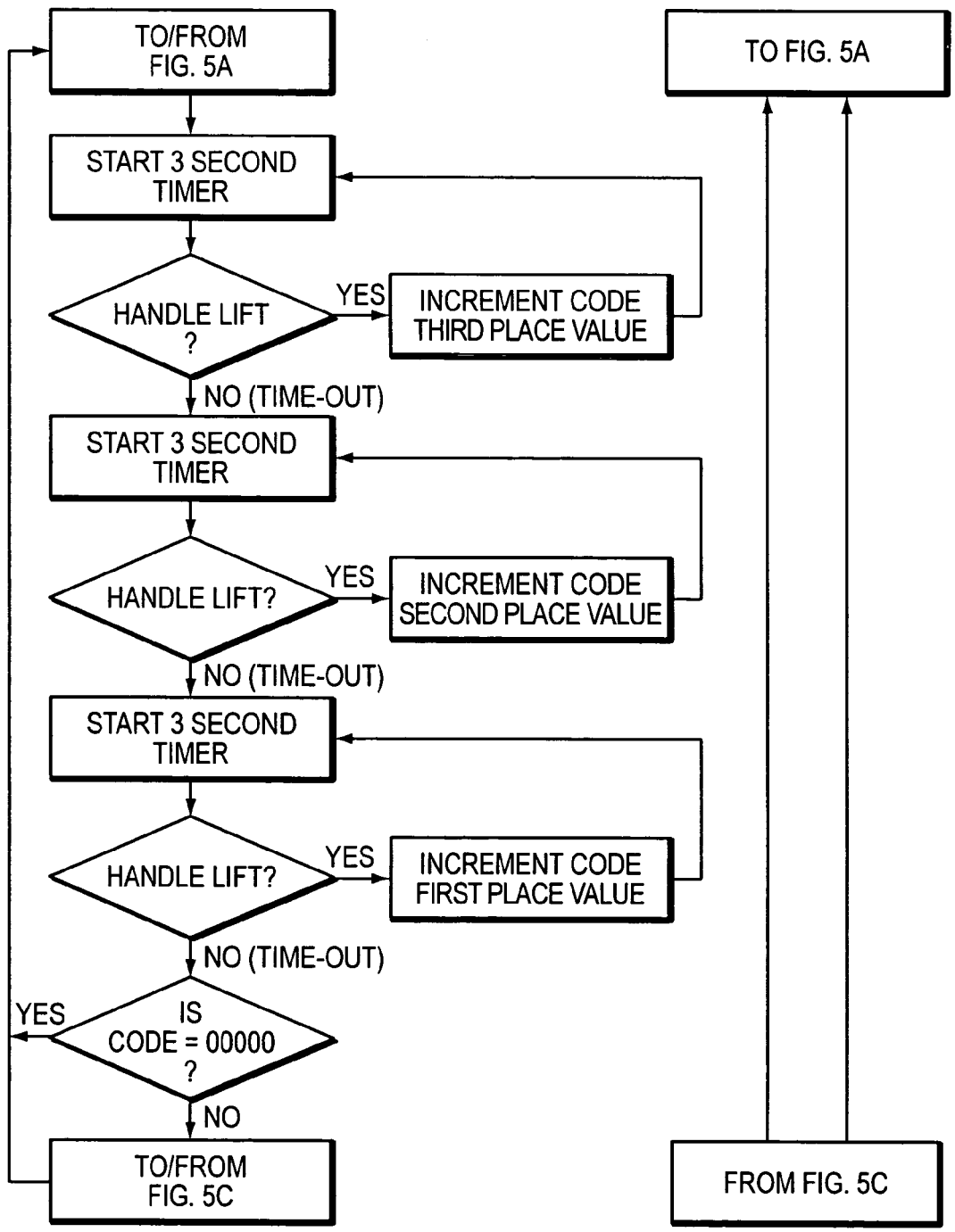
Figure 5C:
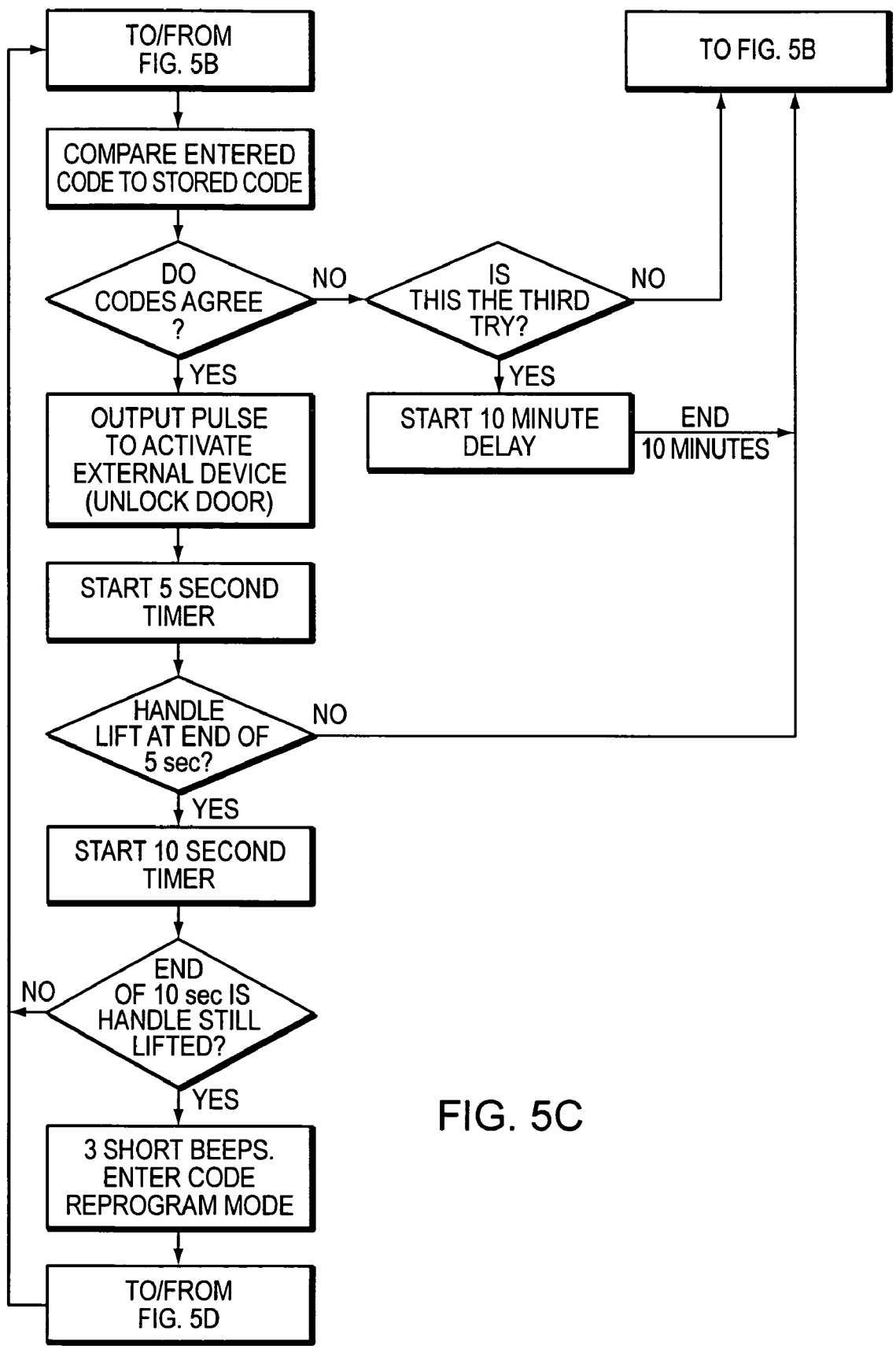
Figure 5D:
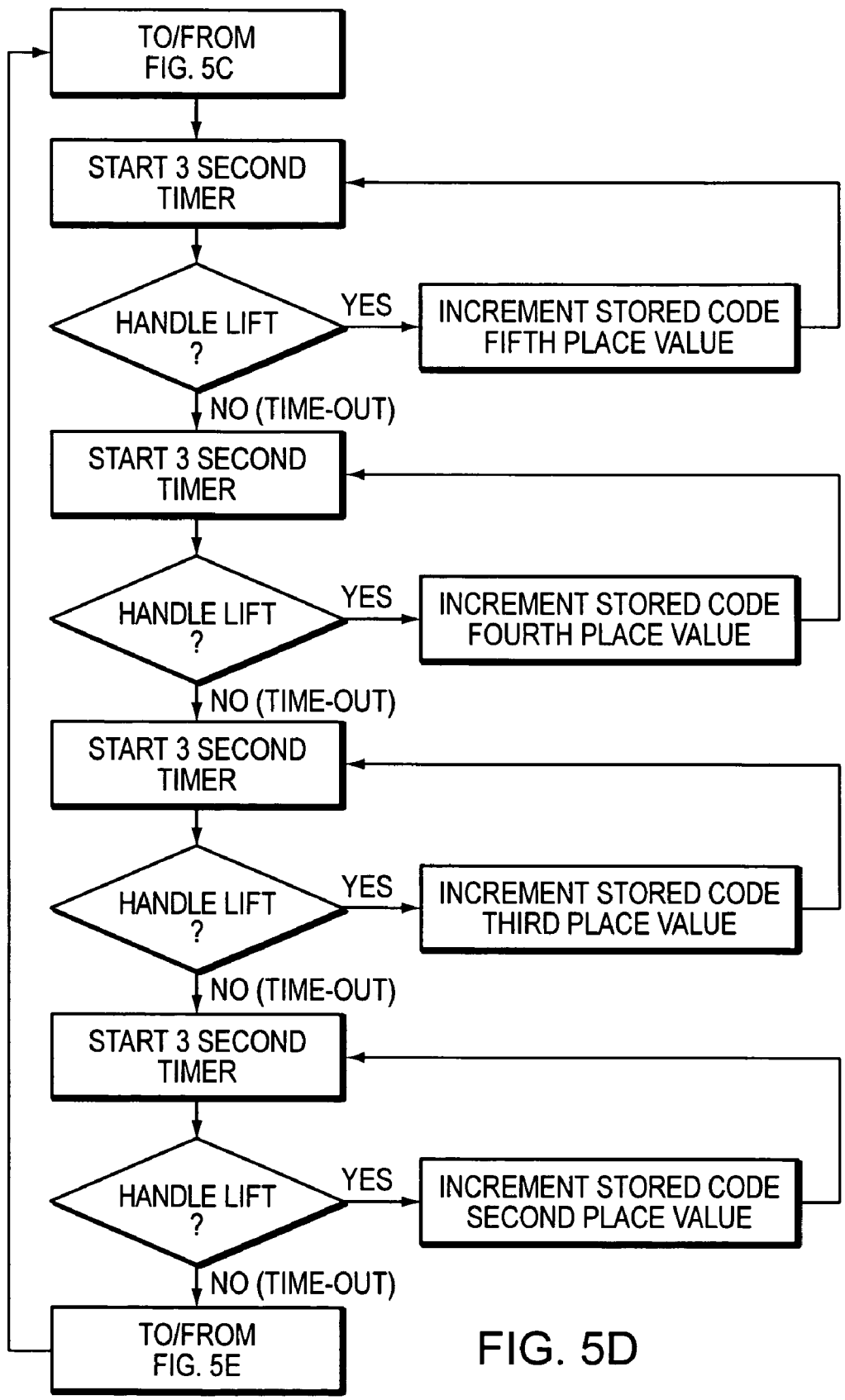
Figure 5E:
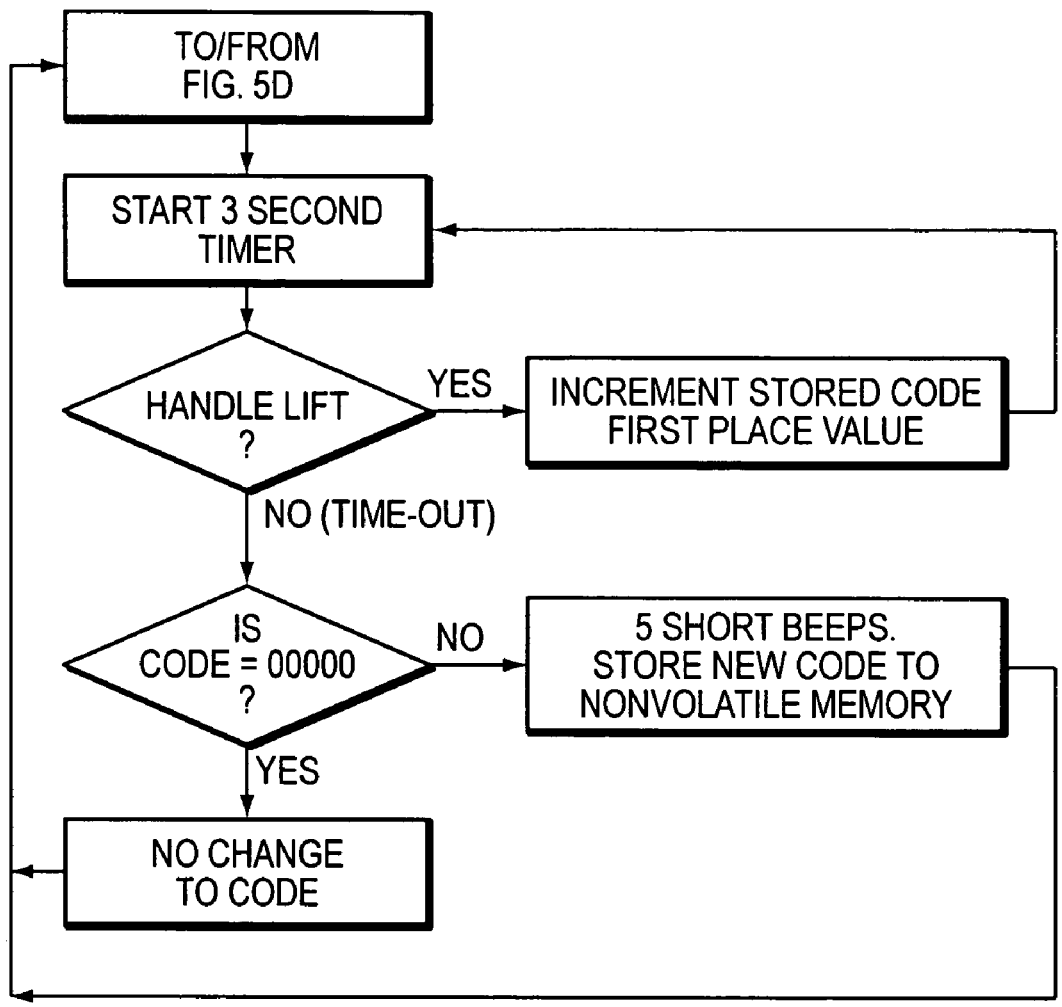

As previously discussed, door handle manipulations in concert with human-perceptible signals enable a user to enter a signal interruption sequence 108 that can be compared with one or more previously-entered codes 10 and which can serve as a basis for actuating a locking element and/or other type of device. By way of non-limiting example and with reference to FIGS. 4A and 4B, a user desiring to enter a particular signal interruption sequence, 2-1-1-2-2, which when properly entered unlocks a locking element 112 of an automobile 104, can communicate an access request to a control element 128 (FIG. 1) of the disclosed technology by performing a sequence of door handle manipulations that cause the control element 128 to enter an access request mode, thereby enabling the user to enter the desired signal interruption sequence (in this case, 2-1-1-2-2) to effectuate access into the interior of the automobile 104. In one illustrative embodiment, a user can enter the first digit (i.e., "2") of the desired signal interruption sequence 108 by lifting a door handle 106 of the automobile 104 during a predetermined time interval (which causes a protruding member 124 of a mechanical linkage assembly 126 coupled to the door handle 106 to interrupt/interfere with an emitted signal 120) and then releasing the door handle (emitted signal 120 is no longer interrupted/interfered with) to signify to a control element 128 that an entry has been made (this initial handle lift-release sequence corresponds to the number "1"). The control element 128 can cause a feedback element 130 to generate, for example, a short beep, to acknowledge the entry. This handle lift-release sequence can be repeated to increment the first digit of the signal interruption sequence 108 to the number "2" and so on until the desired value of the first digit is achieved at which time a user waits for an extended time interval and a long beep before performing the handle manipulations for the second digit of the signal interruption sequence 108. This process is repeated for each of the digits of the signal interruption sequence 108, in this case there are five digits to enter, 2-1-1-2-2. Since this signal interruption sequence 108 includes an arrangement of only two numbers (i.e., 1 and 2), the type of door handle manipulation sequences necessary to represent 2-1-1-2-2 is limited to two types of sequences, illustrated in FIGS. 4A and 4B as manipulation sequences A and B 402, 404.

An exemplary illustration of how time intervals are used in concert with door handle manipulations to identify operating modes and to increment digits associated with a signal interruption sequence 108 is shown in FIGS. 5A–5E. In this exemplary embodiment, a system incorporating at least some aspects of the disclosed technology can transition from an idle mode to a code entry mode following a handle lift that is sustained for at least five seconds and entry of this code entry mode is confirmed by a long beep generated by a feedback element 130 under the control of a control element 128. Once in a code entry mode, handle lifts occurring during three-second time intervals can be used to enter and/or increment particular digits (in this scenario there are five digits) of the signal interruption sequence 108 (referred to as "code" in these figures). If the control element 128 (FIG. 1) determines that no handle lifts have been made during this series of three-second time intervals, the disclosed system returns to an idle mode, otherwise the control element 128 compares the recently-entered signal interruption sequence 108 with a previously-entered code 110. If the compared codes are not substantially equivalent, then the disclosed system can afford a user two additional chances of entering an equivalent code before disabling the system from further data input for approximately ten minutes. If the compared codes are substantially equivalent, the control element 128 can actuate a locking element 112 as previously described. After an additional time delay (e.g., fifteen seconds) during which a handle lift is detected, the user may be provided with access to a program access code mode, which enables the user to reprogram/modify the previously-entered codes 110 in order to support future access requests. A series of three-second time intervals can, as before, be used to enter a desired code. Those skilled in the art will recognize that this embodiment is merely illustrative and that modifications to the time intervals, data entry sequences, beep sequences and durations, and/or other aspects of the disclosed technology can be made without materially affecting the operation of the disclosed technology.

Figure 6A:
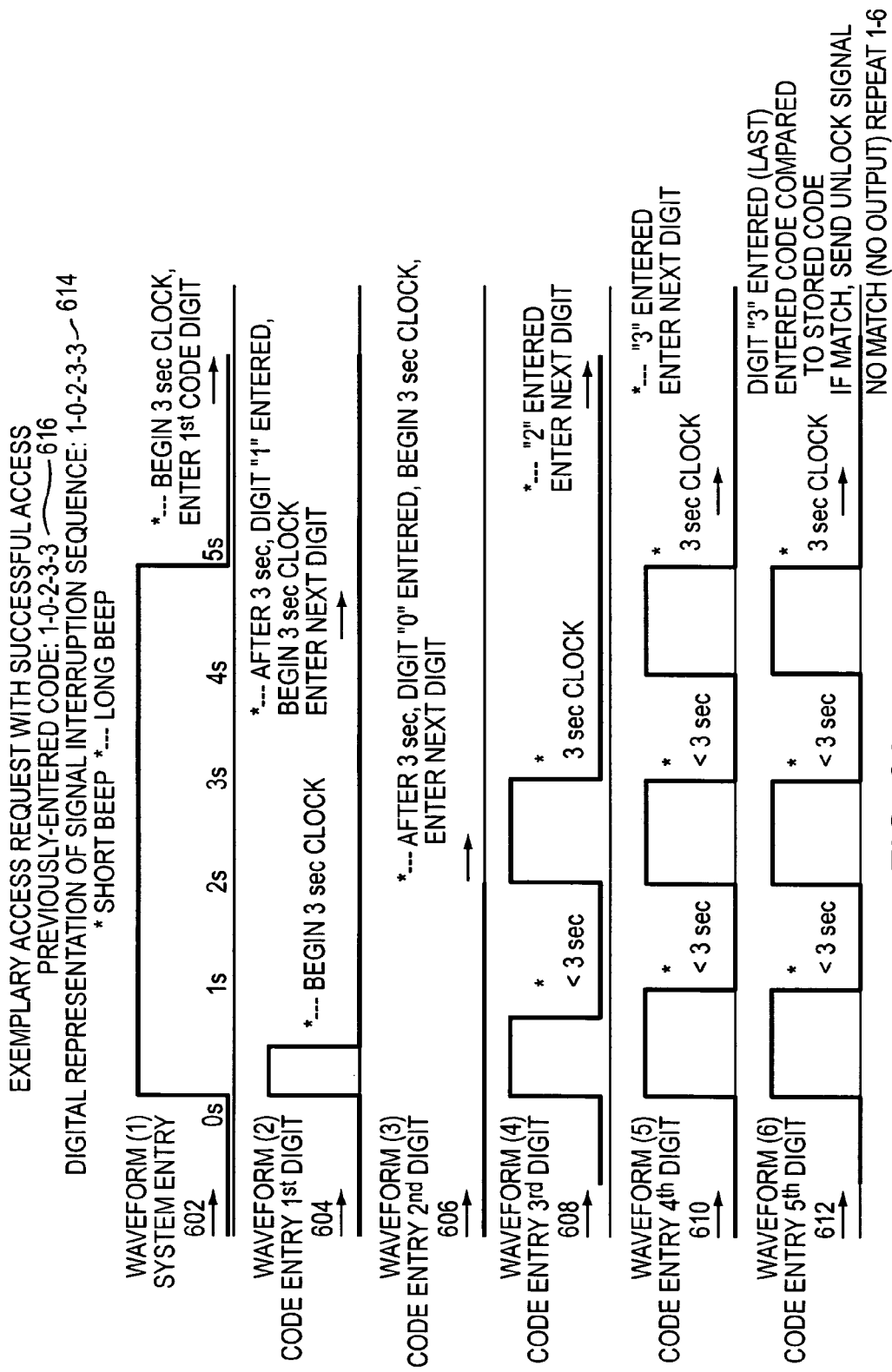
FIGS. 6A–6D provide exemplary timing diagrams that illustrate how a digital representation of a signal interruption sequence and audible feedback can enable an authorized user to obtain access to a restricted-access space and/or to adjust parameters associated with the disclosed technology.
Figure 6B:
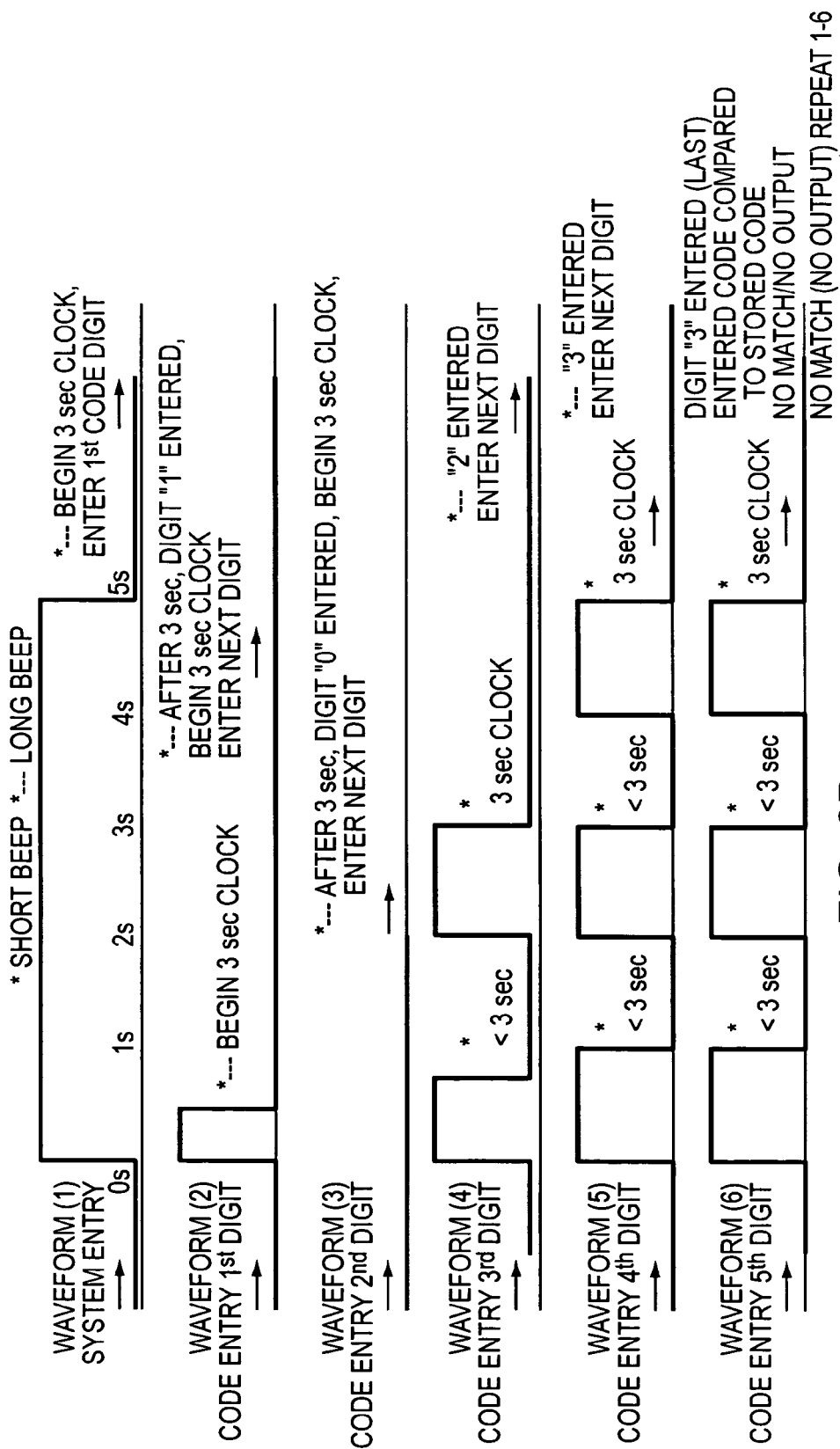
Figure 6C:
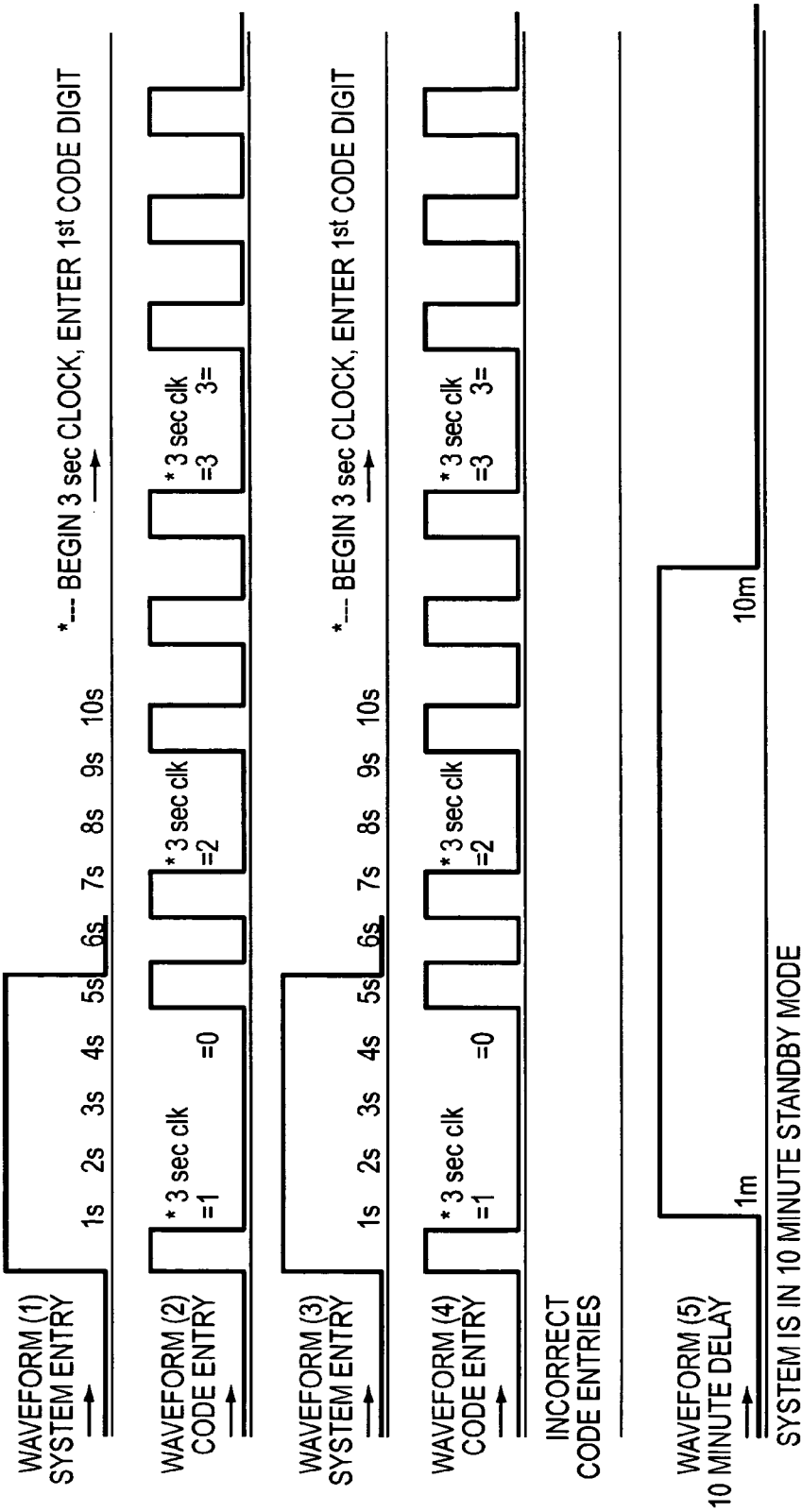
Figure 6D:

FIGS. 6A–6D provide exemplary timing diagrams that further illustrate how door handle manipulations causing interruptions 118 (FIG. 1) in an emitted signal 120 can be digitally represented as a signal interruption sequence 108, which can be compared with previously-entered codes 110 to effectuate an access and/or control of a restricted-access space 102 and/or of items/systems associated therewith. By way of non-limiting example and with reference to FIGS. 1 and 6A, a user intending to gain access to a restricted-access space 102 and/or to items associated therewith can signal a control element 128 of the disclosed technology of such intent by lifting a door handle 106 for five seconds, which is detected as a sequence of signal interruptions 118 in an emitted signal 120 and is digitally represented (see waveform 1 602 in FIG. 6A) and transmitted to the control element 128 by a signal detector 114 component of a movement detection element 116. The control element 128 can acknowledge receipt of the waveform 1 602 digital signals and confirm that a data entry mode has been entered by causing a feedback element 130 to issue an audible signal (e.g., a long beep). As previously described, a user can then lift the door handle 106 during particular three-second time intervals to identify a code, which is manifested as a digital representation of a signal interruption sequence (see waveforms 2–6 604–612). In one embodiment, the control element 128 causes the feedback element 130 to generate different audible signals depending on whether a handle lift corresponds to a particular digit value of a signal interruption sequence 108 or whether such handle lift corresponds to an action intended to increment a particular digit (e.g., short beeps may be generated when a particular digit is being incremented to a different value and long beeps may be generated when a particular digit value has been reached). For example, the digital representation of the signal interruption sequence 614 shown in FIG. 6A corresponds to a code having five digits, where the value of the first digit is "1," the value of the second digit is "0," the value of the third digit is "2," the value of the fourth digit is "3," and the value of the fifth digit is "3." If the entered code, 1-0-2-3-3, is substantially equivalent to a previously-entered code 616, then the control element 128 can generate a signal and/or cause another element to generate a signal to unlock a locking element 112 controlling access to a restricted-access space 102. Similarly and with reference now also to FIGS. 6B–6C, a user who does not remember a previously-entered code 110 and/or who enters such code incorrectly, can be afforded with multiple opportunities to re-enter such code (in the form of a signal interruption sequence) prior to the control element 128 disabling access to the disclosed technology for a period of time (e.g., ten minutes). With reference to FIG. 6D and as previously described, the disclosed technology can also enable an authorized user to re-enter/reprogram a previously-entered code 110 to support future access requests by entering the previously-entered code as proof of the user's identity/authorization (see waveforms 1 and 2), signaling the control element of the user's desire to reprogram a previously-entered code (see waveform 3), and by entering a new code (see waveforms 4 and 5). Although the digital representations illustrated in the timing diagrams of FIGS. 6A–6D represent interruptions 118 in emitted signals 120 as digital pulses exhibiting a positive voltage, those skilled in the art will recognize that such signal interruptions 118 can also be represented as digital pulses exhibiting a negative voltage and/or as other types of electrical signals. Digital pulse durations, time intervals, beep sequences, etc. are also provided for illustrative purposes only and are not intended to limit the disclosed technology.

What is claimed is:

1. A method, comprising:
counting a number of trigger events submitted by a user during successive time intervals, each time interval having a predetermined duration, wherein the number of trigger events counted during a given time interval can be greater than one;
associating the number of trigger events counted in each time interval with one digit of a digit sequence representing a code being submitted by the user, wherein each digit of the digit sequence corresponds to the number of trigger events counted during one of the successive time intervals and can have a value greater than one; and
storing the code submitted by the user to set an activation code required to activate a control element.

2. The method of claim 1, further comprising:
detecting the trigger events during subsequent successive time intervals based on a sequence of signal interruptions caused by these trigger events;
representing at least part of the sequence of signal interruptions as a sequence of digital logic levels;
comparing the sequence of digital logic levels with the stored activation code to ascertain an equivalence there between; and
based on ascertaining the equivalence, activating the control element.

3. The method of claim 2, further comprising:
based on ascertaining the equivalence, identifying a user authorized to activate the control element.

4. The method of claim 2, wherein the sequence of signal interruptions correspond to interruptions in an optical signal.

5. The method of claim 1, further comprising:
generating a feedback signal indicative of at least part of the digit sequence.

6. The method of claim 1, further comprising:
identifying an operating mode based at least partly on a portion of the digit sequence, the operating mode corresponding to a code change request.

7. The method of claim 6, further comprising:
generating a feedback signal indicative of the identified operating mode.

8. The method of claim 1, wherein the trigger events correspond to manipulations of a door handle.

9. The method of claim 1, further comprising issuing a signal, by the control element, used to activate use of at least one of an automobile, a boat, an airplane, a restricted-access space, a building, a container, and a cabinet.

10. The method of claim 1, further comprising the step of temporarily disabling actuation of the locking element in response to detecting a number of consecutive failed attempts to enter an access code that matches the stored code.

11. A method, comprising:
counting a number of trigger events submitted by a user through a user interface during successive tine intervals, each time interval having a predetermined duration, wherein the number of trigger events counted during a given time interval can be greater than one, the user interface affecting at least one operation of a vehicle;
associating the number of trigger events counted in each time interval with one digit of a digit sequence representing a code being submitted by the user, wherein each digit of the digit sequence corresponds to the number of trigger events counted during one of the successive time intervals and can have a value greater than one; and
storing the code submitted by the user to set an activation code required to perform the at least one operation of the vehicle.

12. The method of claim 11, further comprising:
generating a human-perceptible signal indicative of the digit sequence.

13. The method of claim 11, wherein the user interface corresponds to a door handle of the vehicle and the trigger events correspond to manipulations of the door handle.

14. The method of claim 11, wherein the sequence of digits corresponds to interruptions in an optical signal.

15. The method of claim 11, wherein the at least one operation of the vehicle corresponds to at least one of a manipulation of a locking element restricting access to at least a part of the vehicle, a manipulation of a window of the vehicle, and an ignition of the vehicle.

16. The method of claim 11, further comprising the step of temporarily disabling actuation of the locking element in response to detecting a number of consecutive failed attempts to enter an access code that matches the stored code.

17. A system, comprising:
a trigger-detection element detecting a number of trigger events during successive time intervals, each time iterval having a predetermined duration, wherein the number of trigger events detected during a given time interval can be greater than one; and
a control element (a) receiving indicia associated with the trigger events detected by the trigger-detection element, (b) associating the number of trigger events detected in each time interval with one digit of a digit sequence representing a code, wherein each digit of the digit sequence corresponds to the number of trigger events counted during one of the successive time intervals and can have a value greater than one, and (c) storing the code represented by the digit sequence to set an activation code required for the control element to issue an activation signal.

18. The system of claim 17, further comprising:
a feedback element generating a human-perceptible signal indicative of at least part of the digit sequence.

19. The system of claim 17, wherein the control element temporarily disables actuation of the locking element in response to detecting a number of consecutive failed attempts to enter an access code that matches the stored code.

20. The system of claim 17, wherein the activation staxal issued by the control element activates use of at least one of an automobile, a boat, an airplane, a restricted-access space, a building, a container, and a cabinet.

21. The system of claim 17, wherein the trigger-detection element includes a signal emitter and a signal detector, the signal detector detecting a sequence of signal interruptions in an optical signal transmitted by the signal emitter.

22. The system of claim 21, wherein the optical signal exhibits an infrared wavelength.

23. The system of claim 21, wherein the signal detector transmits the indicia associated with the sequence of signal interruptions to the control element.

24. The system of claim 23, wherein the indicla associated with the sequence of signal interruptions corresponds to a sequence of digital logic levels.

25. The system of claim 17, wherein the control element compares a subsequently submitted digit sequence with the stored activation code to determine whether to issue the activation signal.

26. The system of claim 17, wherein the control element identifies an operating mode based at least on a portion of the digit sequence, the operating mode corresponding to a code change request.

* * * * *